June 26, 1956  A. R. LONG  2,751,799
FORWARD AND REVERSE PLANETARY TRANSMISSION
Filed Feb. 26, 1951  4 Sheets-Sheet 1

United States Patent Office 2,751,799
Patented June 26, 1956

2,751,799

FORWARD AND REVERSE PLANETARY TRANSMISSION

Arthur R. Long, Kiel, Wis., assignor to Hart-Carter Company, Peoria, Ill., a corporation of Delaware Application February 26, 1951, Serial No. 212,795

6 Claims. (Cl. 74—769)

This invention relates to improvements in outboard motors and more particularly to outboard motors having improved mechanism for shifting the transmission thereof.

Outboard motors having transmissions which are shiftable to provide a reverse or for other purposes have become increasingly popular. Heretofore, shifting of outboard motor transmissions has required the use of a special shifting lever. Thus, in addition to the throttle lever and motor steering arm, there is an additional lever which the operator must manipulate while the motor is in operation. It is obvious that in maneuvering a boat for docking or other purposes all three of these control devices may have to be actuated in close succession or almost simultaneously. Thus, when maneuvering with prior devices, both hands of the operator as well as his attention are occupied by the motor in the rear, and it is difficult for him to keep a proper lookout ahead.

With the above in mind, it is a general object of the present invention to provide an improved outboard motor having a transmission which is shiftable to provide two forward and one reverse speed, said motor being provided with a simplified control system which greatly enhances the maneuverability of the boat to which the motor is attached, and which minimizes the amount of attention which must be focused by the operator upon the motor.

A further object of the invention is to provide an improved outboard motor of the class described wherein the manually operated throttle control and transmission shifting control are embodied in the engine steering arm and are in positions which permit one hand operation of the motor.

A further object of the invention is to provide an improved outboard motor of the class described wherein the shifting of the transmission is accomplished hydraulically.

A further object of the invention is to provide an improved outboard motor of the class described having a hydraulically operated reverse interlock mechanism which is moved to locking position when the transmission is shifted into reverse, said mechanism preventing upward swinging movement of the motor when the latter is operating in reverse gear.

A further object of the invention is to provide in an outboard motor of the class described, having a separate lubricating oil system, means whereby the lubricating oil is also used as the pressure fluid in the hydraulic control system.

A further, more specific object of the invention is to provide an improved outboard motor of the class described wherein the transmission includes a pair of planetary gear trains which selectively provide direct forward drive gear, trolling gear, and reverse gear, each of said gear drives being accomplished by actuation of a separate hydraulic cylinder, and there being a selector valve actuated by the shifting control on the steering arm for directing fluid under pressure from an oil pump to a selected cylinder.

A further object of the invention is to provide an outboard motor of the class described, having a rotatable handle mounted on the steering arm thereof, said handle being connected to the selector valve for operating said valve.

A further object of the invention is to provide an improved outboard motor having a rotatable cam sleeve mounted on the steering arm adjacent the rotatable transmission shifting handle, there being a cam follower cooperable with said sleeve and movable axially thereof and connected to the motor throttle for actuating said throttle.

A further, more specific object of the invention is to provide an improved outboard motor having a shiftable transmission provided with a clutch, said motor having an hydraulic cylinder of novel construction incorporated therein for actuating said clutch.

With the above and other objects in view, the invention consists of the improved outboard motor, and all of its parts and combinations, as set forth in the claims, and all equivalents thereof.

In the drawings accompanying and forming a part of this specification, wherein is shown one complete embodiment of the preferred form of the invention.

Figures 1, 4, 5, 18, 19:
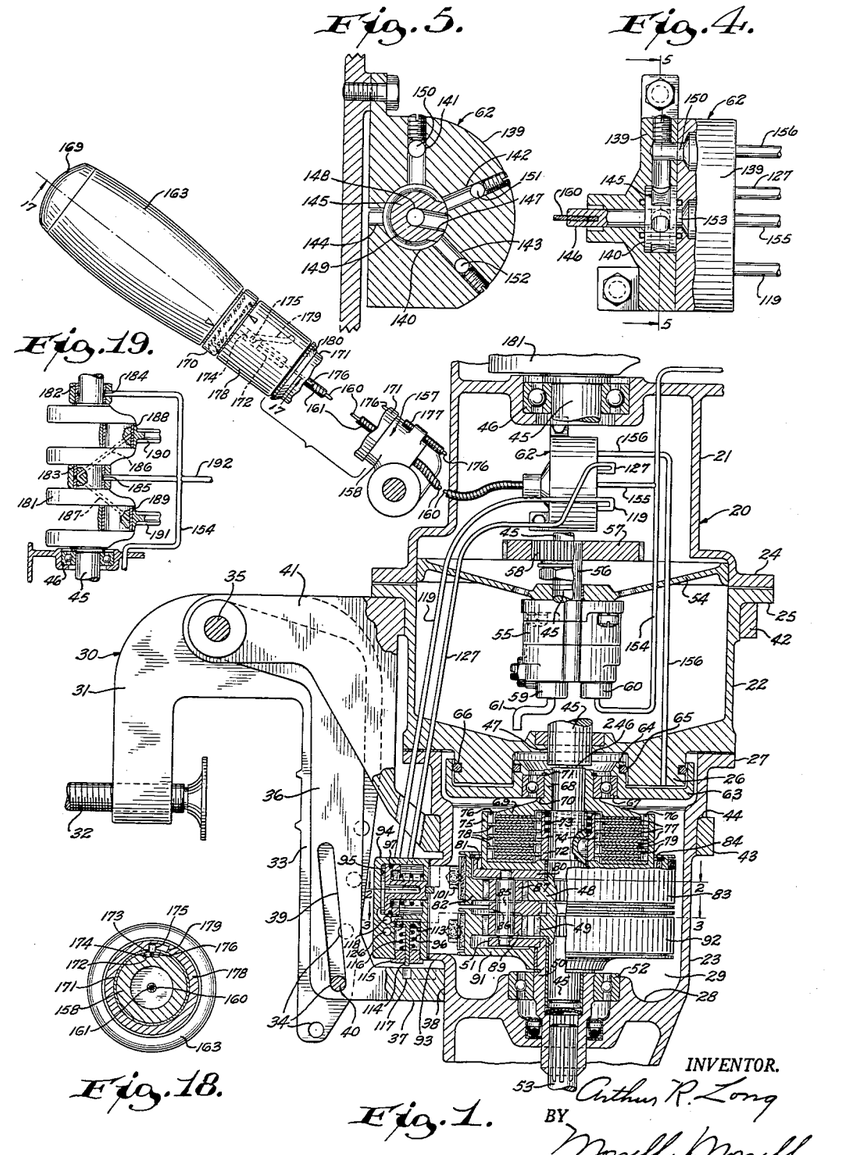
Fig. 1 is a fragmentary vertical sectional view of the improved outboard motor, parts being broken away, and the portion of the steering arm which carries the transmission and throttle control members being rotated approximately 90 degrees from its normal position.
Fig. 4 is an enlarged side elevational view of the disc type selector valve shown in Fig. 1, parts being broken away and shown in vertical section.
Fig. 5 is a vertical sectional view taken approximately along the line 5—5 of Fig. 4.
Fig. 18 is a transverse vertical sectional view taken along the line 18—18 of Fig. 17.
Fig. 19 is a fragmentary diagrammatic view on a reduced scale of a portion of the engine lubricating system of the improved outboard motor.

Referring more particularly to Fig. 1 of the drawing, the improved outboard motor comprises a powerhead (not shown) from which depends an elongated hollow casing 20 which may be formed in three superimposed sections 21, 22 and 23, the latter having a propeller shaft housing (not shown) at its lower end. The sections 21 and 22 are formed respectively with flanges 24 and 25 which are suitably connected together. The casing section 22 is generally cup-shaped and forms a reservoir for lurbicating oil. The bottom wall of the section 22 is formed with a depending annular boss 26 forming a stationary piston, the outer diameter of which is less than the inner diameter of the casing section 23. The casing section 23 is formed at its upper end with an annular outwardly directed flange 27 which is suitably connected to the lower end of the housing section 22 radially outwardly of the boss 26. The casing section 23 is also formed with a horizontal apertured partition 28 spaced below the flange 27 to provide a transmission chamber 29 therewithin, which is above said partition and below the flange 27.

The improved outboard motor is adapted to be mounted on the transom of a boat by means of a clamp and bracket assembly 30, which assembly preferably comprises a pair of C-type clamps 31 each having a hand screw 32. The clamps 31 have elongated depending rear legs 33, which are provided along their rear edges with a plurality of apertures 34. Carried by the clamps 31 is a horizontal pivot bolt 35, and pivotally mounted on the bolt 35 is a pair of generally Z-shaped brackets 36 which extend rearwardly and downwardly, and are connected at their lower ends with a horizontally extending portion 37 which is formed with a bearing surface 38. The latter slidingly abuts the external front wall surface of the casing section 23, as shown. The brackets 36 may be provided with angled elongated slots 39 to receive a pin 40 which pin is positioned in a selected pair of aligned apertures 34 to hold the bracket 36 in a desired angular relationship with respect to the legs 33 of the clamps 31.

Also pivotally mounted on the bolt 35 is a bracket 41 which is formed with a pair of vertically spaced, coaxial, annular bearing yokes 42 and 43. The yoke member 42 rotatably encircles the casing portion 22, and the flange 25 is rotatably slidable on the upper surface of said yoke. The bearing yoke 43 encircles the casing section 23 adjacent the transmission chamber 29, said casing section being formed with an annular shoulder 44 which is rotatably slidable on the upper surface of the yoke member 43.

A drive shaft 45 depends from the powerhead and is journaled in a suitable bearing 46 within the casing section 21. The drive shaft may be formed in two sections which are connected through the use of a splined joint, as at 246, said drive shaft extending through a suitable aperture 47 formed in the closed bottom wall of the casing section 22 and spaced from and coaxial with the annular boss 26. Within the transmission chamber 29 the drive shaft 45 is formed with a pair of spaced, integral sun gears 48 and 49. Rotatably receiving the lower end of the shaft 45 below the sun gear 49 is a sleeve member 50 which depends from a planet carrier plate 51. The sleeve member 50 is mounted in a suitable bearing 52 in the partition 28, and is splined at its lower end to receive a lower drive shaft 53, which shaft extends to the propeller shaft housing (not shown).

An apertured, dish-shaped plate member 54 extends across the bottom of the casing section 21 as shown, and fixed to the underside of said plate is an oil pump 55 having a drive shaft 56 projecting upwardly through said plate parallel with the drive shaft 45. The oil pump drive shaft 56 is provided with a gear 57 which drivingly meshes with a gear 58 on the drive shaft 45. The oil pump is provided with an inlet connection 59 and an outlet connection 60. As previously pointed out, the casing section 22 provides an oil reservoir, and a conduit 61 connects the inlet of the pump 55 with the lower portion of the interior of the casing section 22. A selector valve 62, which will be later described in detail, may be mounted within, or on the side of, the casing section 21.

A centrally apertured cup-shaped cylinder 63 is formed with an upstanding annular flange 64 at the margin of its central aperture. The outer surface of the annular flange 64 slidably engages the inner surface of the annular boss 26 and carries a sealing ring 65 to provide sealing engagement between said surfaces. The outer surface of the depending circular boss 26 is slidingly engaged by the inner side wall surface of the cup-shaped piston 63 and carries an annular sealing ring 66 to provide sealing engagement between said surfaces. The upstanding annular boss 64 is recessed to receive a bearing 67, said bearing surrounding an upstanding tubular extension 68 of a circular pressure plate 69 which is axially slidable on the shaft 45. The tubular extension 68 is formed with a shoulder 70 which engages the lower end of the inner sleeve of the bearing 67 and carries a retaining ring 71 which ring engages the upper end of said sleeve to prevent axial movement of the bearing 67 relative to the plate 69.

Below the pressure plate 69 a sleeve 72 is keyed to the shaft 45, said sleeve being formed at its upper end with a portion of enlarged bore to receive a compression spring 73, said spring having its upper end in abutment with the lower face of the pressure plate 69. The sleeve 72 is formed with a plurality of external splines 74.

Freely rotatable on the shaft 45 below the collar 72 is a cup-shaped clutch drum 75 which is formed with a plurality of internal splines 76. A plurality of centrally apertured circular clutch plates 77 are centrally splined to non-rotatably receive the splines 74 of the collar 72, said plates having an outer diameter smaller than the distance between diametrically opposite splines 76, as shown. A plurality of circular clutch plates 78 have their peripheral edges notched to non-rotatably receive the splines 76, and also have a central aperture of greater diameter than the diametric distance between the outer surfaces of diametrically opposite splines 74. The clutch plates 77 are alternated with the clutch plates 78, and interposed between adjacent clutch plates 77 and 78 are annular plates 79 of suitable friction material.

It is apparent that when the pressure plate 69 does not press downwardly on the clutch plates, the clutch drum 75 and the clutch plates 78 are rotatable relative to the shaft 45, collar 72, and clutch plates 77. Downward pressure on the clutch plates by the pressure plate 69, however, locks the clutch drum 75 to the shaft 45.

Fixed coaxially to the underside of the clutch drum 75, and rotatable therewith on the shaft 45, above the sun gear 48, is an upper planet carrier plate 80. The plate 80 is circular in shape and is formed with an upstanding peripheral flange 81 which is spaced outwardly from the periphery of the drum 75. An internal ring gear 82 is formed with a channel shaped peripheral brake drum for receiving a brake band 83, said drum carrying an internal retaining ring 84 adjacent its upper edge, which ring slidably engages the upper edge of the flange 81 to thereby rotatably support the ring gear 82 on said flange.

Carried by and extending axially between the lower carrier plate 51 and upper carrier plate 80 are planet pinion shafts 85, preferably three in number. An intermediate planet carrier plate 86 is rotatably positioned around the shaft 45 between the sun gears 48 and 49 and is apertured to receive the pinion shafts 85. Rotatably mounted on each of the planet pinion shafts 85 between the carrier plates 80 and 86 is a planet pinion 87 which meshes with the ring gear 82 as well as with the sun gear 48.

Figure 3:
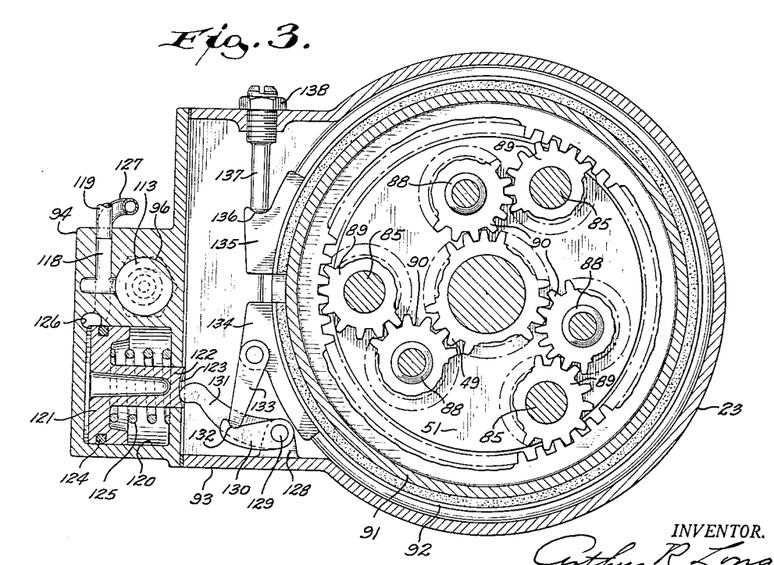
Fig. 3 is an enlarged fragmentary transverse sectional plan view taken approximately along the line 3—3 of Fig. 1, parts being broken away.
Figure 6:
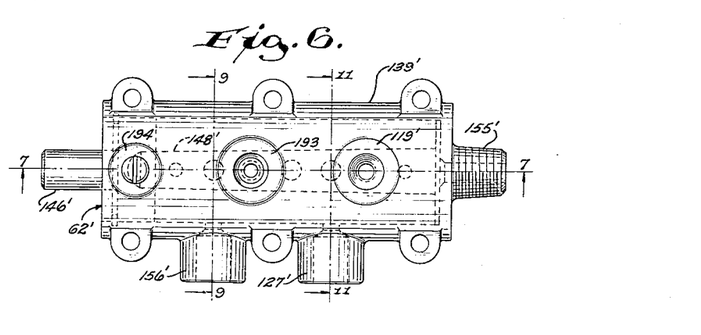
Fig. 6 is a plan view of a modified form of selector valve adapted for use in the improved outboard motor and having a rotatable cylinder embodied therein.

Referring to Fig. 3, the carrier plates 51 and 86 rotatably carry therebetween planet pinnon shafts 88, preferably three in number. Rotatably mounted on each of the pinion shafts 88 is a planet pinion 90 which meshes with the sun gear 49. Rotatably mounted on each of the pinion shafts 85 between the carrier plates 51 and 86 is a pinion 89, which pinion meshes with the adjacent pinion 90. A generally cup-shaped internal gear 91 is freely rotatable on the sleeve 50 and has a channel shaped peripheral brake drum for receiving a brake band 92. The internal gear 91 meshes with each of the pinions 89 as shown in Fig. 3.

Figure 2:
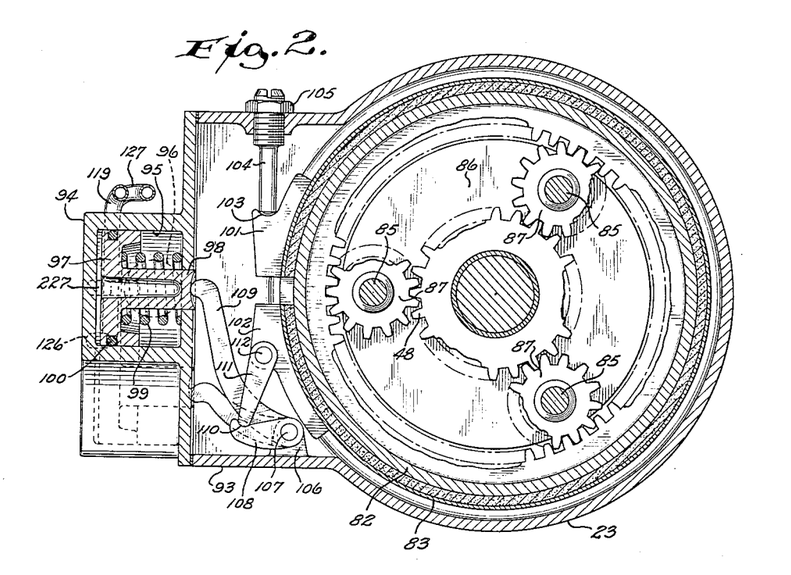
Fig. 2 is an enlarged fragmentary transverse sectional plan view taken approximately along the line 2—2 of Fig. 1, parts being broken away.

Referring to Figs. 2 and 3, the housing section 23 is formed with a forwardly projecting generally rectangular extension 93 adjacent the brake bands 83 and 92. A cylinder block 94 is formed on the front wall of the casing extension 93, as also shown in Fig. 1. The cylinder block 94 is formed with a horizontal cylindrical bore 95 and with a vertical cylindrical bore 96 therebelow. Positioned in the bore 95 is a piston 97 having a stem 98 which slidably projects through a suitable aperture in the front wall of the casing extension 93, as shown in Fig. 2. Surrounding the stem 98, within the bore 95, is a helical spring 99 having one end in abutment with the front wall of the casing extension 93 and having its other end in abutment with the piston 97 to urge said piston outwardly. The piston 97 may carry an annular sealing ring 100.

As shown in Fig. 2, the brake band 83 is formed at its ends with a pair of lugs 101 and 102. The lug 101 is formed with a depression 103 which is adapted to receive the inner end of an adjustable retaining screw 104 which is threaded horizontally through the adjacent side wall of the casing extension 93 and is provided with a lock nut 105. The opposite side wall of the casing extension 93 is formed with an inwardly projecting lug 106 which carries a rotatable pivot pin 107 having arms 108 and 109 fixed thereto. The arm 109 has its free end positioned in engagement with the dished inner end of the piston stem 98, as shown. The lever 108 has its end portion formed with a depression 110 in which is received the free end of a lever 111, the latter being pivotally connected to the lug 102 as at 112. It is apparent that inward movement of the piston 97 and its stem 98 causes compression of the spring 99 and, through the levers 109, 108 and 111, causes tightening of the brake band 83 about the ring gear 82.

Referring to Fig. 1, a piston 113 is slidably positioned in the bore 96 and is formed with a stem 114. The lower end of the bore 96 is closed by a centrally apertured nut 115 through which the stem 114 slidably projects. A helical compression spring 116 surrounds the stem 114 above the nut 115 and urges the piston 113 upwardly. The portion 37 forming part of the Z-shaped brackets 36 is formed in its upper surface with an arcuate groove 117 directly below the stem 114 and positioned to receive said stem upon downward movement of the latter. The groove 117 is preferably of such conformation that it is adapted to receive the stem 114 in any position within the range of rotative movement of the motor in the bearing yokes 42 and 43. It is apparent that when the stem 114 is positioned in the groove 117, the motor is prevented from swinging upwardly about the pivot bolt 35. As shown in Figs. 1 to 3, the cylinder block 94 is formed with a passage 118 extending inwardly from a side wall thereof and communicating at its inner end with the outer end of the cylinder bore 120 through port 126 and with the upper end of the cylinder bore 96. A conduit 119 affords communication between the outer end of the passage 118 and the selector valve 62.

The cylinder block 94 is also formed with a horizontal cylinder bore 120 which is positioned below and offset to one side of the cylinder bore 95, as shown in Fig. 3. A piston 121, similar to the piston 97 is positioned in the bore 120, said piston having a stem 122, the inner end of which is dished as at 123. The piston 121 may carry an annular sealing ring 124. A compression spring 125, similar to the compression spring 99, is positioned around the stem 122 and urges the piston 121 outwardly. The cylinder block 94 is formed with a passage 126 which extends inwardly from one side wall and communicates with the outer end of the cylinder bore 120, as shown. A conduit 127 connects with port 227 and affords communication between the outer end of cylinder 95 and the selector valve 62.

Below the lug 106 the side wall of the casing extension 93 is formed with a lug 128 in which a vertical pivot pin 129 is rotatably mounted. Fixed to the pin 129 are arms 130 and 131, arm 131 having its outer end in engagement with the dished end wall 123 of the stem 122. The arm 130 is formed with a depression 132 in which is received one end of a lever 133, the latter being pivotally connected at its other end to a lug 134 formed on one end of the brake band 92. The other end of the brake band 92 is formed with a lug 135 which is formed with a depression 136 for receiving the inner end of an adjustable retaining screw 137 which screw is threaded through the adjacent side wall of the casing extension 93 and is provided with a lock nut 138. It is apparent that inward movement (to the right in Fig. 3) of the piston 121 causes compression of the spring 125 and, through the levers 131, 130 and 133, causes tightening of the brake band 92 about the ring gear 91.

Referring to Figs. 1, 4 and 5, the preferred form of selector valve 62 has a body 139 formed with a cylindrical chamber 140 therein and having four spaced passages 141, 142, 143 and 144 extending radially therefrom, preferably in the same plane. A cylindrical valve member 145 of substantially the same dimensions as the chamber 140 is rotatably positioned in said chamber and is formed with an axial stem 146 which rotatably projects through the adjacent side wall of the body 139. The valve member 145 is formed with a radial passage 147, the axis of which is preferably coplanar with the axes of the passages 141 to 144. The valve member 145 is also formed with an axial bore 148 communicating with the passage 147 and with the end wall of said valve member opposite the stem 146. The valve member 145 is also formed with a substantially C-shaped, circumferentially extending groove 149, which groove is preferably coplanar with the passages 141 to 144 and terminates a predetermined distance from the passage 147, as shown. The valve body 139 is also formed with passages 150, 151 and 152 which extend parallel with the axis of the valve member 145 and communicate respectively with the passages 141, 142 and 143. A passage 153 is formed in the body 139 parallel with the passages 150 to 152, and communicates with the axial bore 148 of the valve member 145, as shown.

The conduit 127 communicates with the passage 151, and the conduit 119 communicates with the passage 152. A conduit 154 connects at one end with the outlet 60 of the pump 55 and extends upwardly to the power head lubricating system in a manner to be later described. A conduit 155 branches off from the conduit 154 and communicates with the passage 153 in the valve body 139. A conduit 156 communicates at one end with the passage 150 in the valve body 139 and communicates at its other end with the lower end wall of the stationary piston 26, as shown in Fig. 1. It is apparent that by rotating the valve member 145 and causing selective registration of the passage 147 of said member with one of the passages 141 to 143, fluid under pressure will be directed from the pump 55 into the selected conduit.

Figure 17:
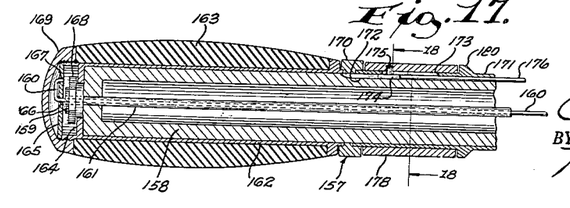
Fig. 17 is a longitudinal sectional view taken through the steering arm of the improved outboard motor approximately along the line 17—17 of Fig. 1.

Referring to Figs. 1 and 17, the numeral 157 indicates a steering arm which is suitably connected to the casing 20. The steering arm 157 includes an elongated tubular member 158 having its outer end closed and formed with an axially projecting stud 159, the stud 159 and the end wall on which it is formed being axially apertured to receive a Bowden wire 160 and a tubular sheath 161 therefor. A handle sleeve 162, having a covering 163 of rubber or other suitable material, is rotatably mounted on the tubular member 158, and spaced from its outer end, said member is formed with an inturned annular flange 164 which engages the end wall of the sleeve 158. A nut 168 is threaded on the stud 159, said nut overlapping the flange 164 to retain the sleeve on the member 158. A disc 165 is positioned against the open outer end of the handle sleeve 162 and is formed with a central aperture 166 and with an aperture 167 spaced therefrom to receive the reversely bent end portion of the Bowden wire 160. A cup-shaped cap 169 which is threaded on the outer end of the handle sleeve 162 urges the disc 165 against the adjacent end of said handle sleeve to prevent rotation of said disc relative to said sleeve.

Fixed concentrically on the member 158 adjacent the inner end of the handle sleeve 163 is an index ring 170, and telescopically fixed on the member 158 at the opposite side of the member 170 from the handle 163 is a sleeve member 171 (see Fig. 17). The sleeve member 158 is formed with a longitudinally extending groove 172 below the sleeve 171, and the sleeve 171 is formed with a longitudinal groove 173 above and in alignment with the groove 172 of the member 158. A cam follower 174 is longitudinally slidably positioned in the groove 172 and is formed with a pin 175 projecting upwardly therefrom through the groove 173. A Bowden wire 176 is fixed at one end to the cam follower 174 and is positioned in the groove 172, extending beyond the end of the sleeve 171 into a sheath 177 carried by the inner end of the member 158.

A throttle control sleeve 178 is rotatably mounted on the sleeve 171 and is formed on its inner wall surface with a cam groove 179 in which is received the outer end of the pin 175 of the cam follower 174. The cam groove 179 may be generally S-shaped as shown in Fig. 1, and is of such conformation that rotation of the sleeve 178 causes longitudinal movement of the cam follower 174 and of the Bowden wire 176. The sleeve 171 is formed with an integral shoulder 180 positioned adjacent one end of the throttle control sleeve 178, the shoulder 180 and the index ring 170 preventing axial movement of the throttle control sleeve while permitting rotation thereof. As shown in Figs. 1 and 4, the opposite end of the Bowden wire 160 is fixed in the stem 146 of the selector valve 62. The other end of the Bowden wire 176 is connected to the carburetor throttle arm (not shown). It is apparent that rotation of the handle 163, through the Bowden wire 160, causes like simultaneous rotation of the valve member 145. It is likewise apparent that rotation of the throttle control sleeve 178 will cause simultaneous axial movement of the Bowden wire 176, which in turn will actuate the carburetor throttle arm.

Referring to Fig. 19, it will be seen that the upper end of the drive shaft 45 is formed with a crank shaft 181 which shaft is rotatably mounted in fixed sleeve bearings 182 and 183. The bearings 182 and 183 are formed respectively with internal annular oil grooves 184 and 185, and the crank shaft 181 is formed with suitable oil passages 186 and 187 which afford communication between the oil groove 185 and a pair of connecting rod bearings 188 and 189. Connecting rods 190 and 191 carry the bearings 188 and 189 respectively and are thereby pivotally connected to the crank shaft 181. The conduit 154 communicates with the oil grooves 184 and 185 of the bearings 182 and 183 respectively and may have a branch conduit 192 for delivering lubricating oil under pressure to other mechanisms such as a cam shaft mechanism (not shown).

Operation

With the parts in the positions shown in Figs. 1 to 5 and 17 and 18, the throttle of the power head is set at slow position and the transmission is in neutral gear where it will transmit no power from the drive shaft 45 to the driven shaft 53. In neutral gear the pressure plate exerts no downward pressure on the clutch discs, and the brake bands 83 and 92 are released to permit rotation of the ring gears 82 and 91. With the power head in operation, the oil pump 55 pumps oil into the conduit 154, said oil being delivered to the bore 148 of the selector valve member 145 and also being delivered to the crank shaft bearings 182, 183, 188 and 189 for lubrication thereof. The pump 55 may be provided with the usual pressure relief valve which permits the oil to be by-passed into the reservoir provided by the casing section 22 when the pressure at the pump outlet exceeds a predetermined amount.

Assuming that the motor is attached to a boat which is tied alongside a dock, and that it is desired to maneuver the boat away from the dock first by rearward movement, and then by forward movement, the transmission is shifted to reverse gear by simply rotating the handle 163 on the steering arm 157 in a clockwise direction as viewed from the left in Fig. 1 until the indicator on the handle 163 is moved to the reverse position indicated on the index ring 170. This rotation of the handle can be accomplished by the steering hand of the operator. Rotation of the handle 163 in the manner described rotates the valve member 145 of the selector valve 62 in a clockwise direction as viewed in Fig. 5 to bring the passage 147 of the valve member into registration with the passage 143 of the valve body 139. This directs fluid under pressure into the passage 143 and conduit 119.

The conduit 119 delivers the fluid under pressure to the passage 118, which, in turn, delivers said fluid to the cylinders 120 and 96 (see Figs. 1 to 3) ahead of the pistons 121 and 113 respectively. The spring 116, which urges the piston 113 upwardly, is of such strength compared with the spring 125, which latter spring urges the piston 121 outwardly, that when fluid under pressure is admitted to the cylinders 120 and 96 through the passage 118, the piston 113 is moved downwardly to position the end of its stem 114 in the groove 117 before any substantial inward movement of the piston 121 occurs. Movement of the stem 114 into the groove 117, of course, locks the motor against upward swinging movement about the pivot bolt 35.

As the fluid under pressure forces the piston 121 inwardly against the action of the spring 125, said piston, through the stem 122 thereof, pivots the arm 131, pin 129, and arm 130 in a clockwise direction as viewed in Fig. 3. Through the pivotal link 133 the lug 134 is forced toward the lug 135, the latter lug being held against movement in this direction by the retaining screw 137. This action results in tightening of the brake band 92 about the ring gear 91, to prevent rotation thereof. Rotation of the drive shaft 45 and its sun gear 49 then causes opposite rotation of the pinions 90 which, through the pinions 89, impart reverse rotation to the carrier plates 51 and 86, as well as to the sleeve 50. The sleeve 50 imparts said reverse rotation to the driven shaft 53 for delivery to the propeller (not shown). Since it is the planetary movement of the pinions 90 and 89 which is imparted to the carrier plates 51 and 86 and to sleeve 50, the reverse rotation produced is necessarily at a reduced speed relative to the speed of rotation of the drive shaft 45.

The speed of the drive shaft 45 can be increased by rotating the throttle control sleeve 178 in a clockwise direction as viewed from the left in Figs. 1 and 17, to move the cam follower 174 and the Bowden wire 176 to the right and thereby increase the throttle opening of the power head. This change in the throttle setting can also be readily accomplished by the steering hand of the operator, which need not leave the steering arm 157 for this purpose.

To accomplish forward movement of the boat to which the outboard is attached, it is only necessary to rotate the handle 163 in a counterclockwise direction as viewed from the left in Figs. 1 and 17 to move the indicator on said handle to either the low or the high position indicated on the index ring 170. Movement to the low position causes rotation of the valve member 145 of the selector valve 62 in a counterclockwise direction as viewed in Fig.

5, to bring the passage 147 of said valve member into registration with the passage 142 of the valve body 139.

This movement brings the circumferential groove 149 of the valve member 145 into communication with the passage 143 of the valve body to release the pressure in the conduit 119 and in the cylinders 120 and 96. The action of the springs 116 and 125 forces the pistons 113 and 121 upwardly and outwardly respectively to force the fluid in said cylinders back through the conduit 119, passage 143, groove 149 and scavenge port 154, from which it flows back to the reservoir. Upward movement of the piston 113 moves the stem 114 out of the groove 117 to again permit upward swinging movement of the motor about the pivot bolt 135. Outward movement of the piston 121 also releases the brake band 92 to permit rotation of the ring gear 91.

Registration of the passage 147 with the passage 142 directs fluid under pressure into the latter passage and into the conduit 127 which conduit in turn delivers said fluid behind the piston 97 in the valve block 94, to cause inward movement of the piston 97 against the action of the spring 99. The inward movement of the piston 97, through its stem 98, causes clockwise swinging movement (as viewed in Fig. 2) of the arm 109, pin 107, and arm 108, fixed thereto. This movement of the arm 108, through the link 111, moves the lug 102 toward the lug 101 to tighten the brake band 83 about the ring gear 82 and prevent rotation of said ring gear. When the ring gear 82 is so locked, rotation of the drive shaft 45 and its sun gear 48 causes reverse rotation of the pinions 87. Rotation of the pinions 87 causes planetary movement of said pinions and of the shafts 85 which results in rotation of the carrier plates 51 and 86 at a reduced speed in the direction of rotation of the shaft 45. This movement of the carrier plates 51 and 86 is transmitted through the sleeve 50 to the driven shaft 53.

To shift the transmission into high gear it is only necessary to rotate the handle 163 until the indicator points to the high position on the index ring 170. This rotates the valve member 145 in a counterclockwise direction as viewed in Fig. 5 to bring the passage 147 of said valve member into registration with the passage 141 of the valve body 139. The circumferential groove 149 is thereby brought into communication with the passage 142 to release the fluid pressure in the cylinder 95, and conduit 127; and to permit the spring 99 to move the piston 97 outwardly, forcing the fluid in the cylinder 95 out through the conduit 127, passage 142, groove 149 and scavenge port 144, back to the reservoir. It is apparent that outward movement of the piston 97 releases the brake band 83 to permit rotation of the ring gear 82.

Registration of the passage 147 with the passage 141 directs fluid under pressure into the conduit 156, which, in turn, delivers it between the stationary piston 26 and the movable cylinder 63 to cause downward movement of the latter. Downward movement of the cylinder 63 causes like movement of the pressure plate 69 which locks the clutch discs 77, 78 and 79 together and thereby locks the clutch drum 75 and carrier plate 80 to the drive shaft 45. Rotation of the drive shaft 45 is then imparted directly to the driven shaft 53. In high gear the driven shaft 53 rotates at the same speed and in the same direction as the drive shaft 45.

Upon rotation of the handle 163 to any of the other gear shift positions, the circumferential groove 149 of the valve member 145 is brought into communication with the passage 141, and the pressure in the cylinder 63, conduit 156, and passage 141 is thereby relieved. The spring 73 then urges the pressure plate 69 and cylinder 63 upwardly to force the fluid in the cylinder 63 back through conduit 156, passage 141, groove 149, and out of the scavenge port 144 to the reservoir. Upward movement of the pressure plate 69 releases the clutch and permits relative rotation of the clutch plates 77 and 78.

It is apparent that with the improved outboard motor construction the transmission can be quickly and easily shifted from one gear condition to another by a mere turn of the handle 163, and the speed of the power head can similarly be varied by a turn of the control sleeve 178. Both of these operations can be accomplished by one hand of the operator without the necessity of said operator removing his hand from the steering arm 157. In addition, the improved outboard motor provides an automatically operable reverse lock which engages upon shifting to reverse gear.

Figs. 6 to 16 show two modified forms of the selector valves which may be used in place of the preferred form of selector valve 62. Figs. 6 to 12 show a rotatable cylinder type valve 62' having a valve body 139' formed with a cylindrical bore 140' which is opened at one end and closed at the opposite end. The closed end of the body 139' is formed with an axially apertured connection member 155'. Rotatably mounted in the cylindrical bore 140' is a cylindrical valve member 145' which is held in the bore 140' by a retaining ring 192 and is prevented from axial movement by said ring.

The valve member 145' is formed with an axial passage 148' having a closed end and having an opposite open end in communication with the axial aperture in the connection member 155'. The valve body 139' is formed with a pair of spaced tubular connection members 119' and 193, each of which communicates with the bore 140', as shown. The valve body 139' is also formed with a pair of spaced tubular connection members 156' and 127' which are axially offset from the connection members 193 and 119', and which are preferably angularly offset therefrom by approximately 90 degrees, as shown.

The end of the valve member 145' which is adjacent the open end of the bore 140' is formed with generally V-shaped peripheral notches R, N, L and H, the apexes of which are preferably equi-angularly displaced. Adjacent the notched portion of the valve member 145', the body 139' is formed with a radially outwardly directed tubular extension 194 having a screw plug 195 threaded therein. A compression spring 196 is positioned within the bore of a tubular extension 194 and urges a ball 197 into one of the peripheral notches of the valve member 145'. The action of the spring 96 urging the ball 197 inwardly into coaction with one of the peripheral notches causes the valve member 145' to assume a definite position of rotation so that the ball 197 is centrally seated in one of the notches. It is apparent that the ball 197 can hold the valve member 145' in a selected one of four positions. The notches R, N, L and H respectively correspond to reverse, neutral, low and high gear position. As shown in Figs. 6 to 12, the valve member 145' is in neutral position.

The valve member 145' is formed with a peripheral C-shaped groove 198 (Figs. 7 and 9), which communicates with the tubular extension 156', as shown. The valve member 145' is also formed with a radially extending passage 200 which communicates with the central passage 148', the passage 200 being positioned to communicate with the tubular extension 156' when the valve member is rotated to high position. The valve body 139' is formed with a scavenging port 199 which communicates with the groove 198 in all positions of movement of the valve member 145'.

The valve member 145' is formed with a peripheral C-shaped groove 201 (Figs. 7 and 10), similar to the groove 198 and positioned for communication with the tubular extension 193, as shown. The valve member 145' is also formed with a passage 202 which is similar to the passage 200 and which is positioned to communicate with the tubular extension 193 when the valve member is rotated to reverse position. The valve body 139' is formed with a scavenging port 203 which communicates with the peripheral groove 201 in all positions of movement of the valve member.

Figure 7:
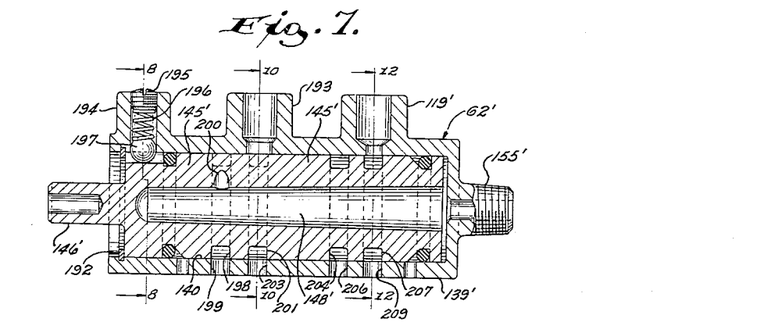
Fig. 7 is a longitudinal vertical sectional view taken along the line 7—7 of Fig. 6.
Figure 8:
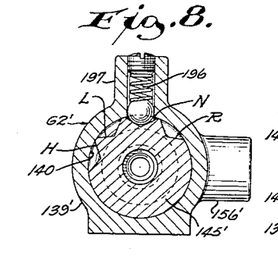
Fig. 8 is a transverse vertical sectional view taken approximately along the line 8—8 of Fig. 7.
Figures 9, 10:
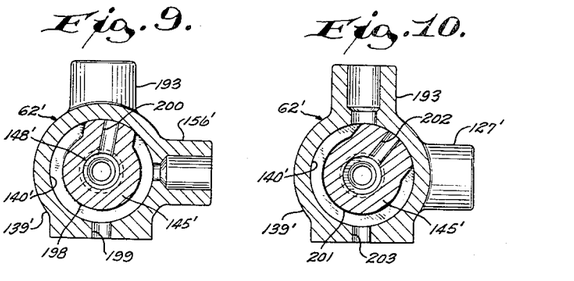
Fig. 9 is a transverse vertical sectional view taken approximately along the line 9—9 of Fig. 6.
Fig. 10 is a transverse vertical sectional view taken along the line 10—10 of Fig. 7.
Figures 11, 12:
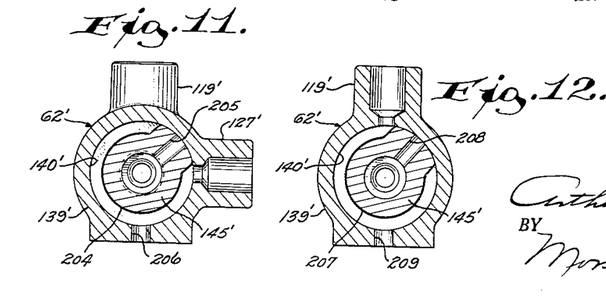
Fig. 11 is a transverse vertical sectional view taken along the line 11—11 of Fig. 6.
Fig. 12 is a transverse vertical sectional view taken along the line 12—12 of Fig. 7.

As shown in Figs. 7 and 11, the valve member 145' is formed with a C-shaped peripheral groove 204 similar to the grooves 198 and 201, said groove being positioned for communication with the tubular extension 127'. The valve member 145' is also formed with a radially directed passage 205 which is similar to passages 200 and 202 and which is positioned for communication with the tubular extension 127' when the valve member is rotated to low position. The valve body 139' is formed with a scavenging port 206 which is positioned in communication with the peripheral groove 204 in all positions of the valve member 145'.

Referring to Figs. 7 and 12, the valve member 145' is formed with a C-shaped peripheral groove 207 which is similar to the peripheral grooves 198, 201 and 204 and which is positioned for communication with the tubular extension 119'. The valve member is also formed with a radially directed passage 208 which is similar to the passages 200, 202, and 205, and which is positioned for communication with the tubular extension 119' when the valve member is rotated to reverse position. The valve body 139' is formed with a scavenging port 209 which communicates with the peripheral groove 207 in all positions of movement of the valve member 145'.

When the valve 62' is used in place of the preferred valve 62, the conduits 119, 127, 155 and 156 are connected respectively to the tubular extensions 119', 127', 155' and 156'. When desired, the cylinder block 94 may be formed with separate passages for each cylinder 95 and 96 in place of the single passage 118. In such a case the conduit 119 is connected with the passage for the cylinder 120, and a separate conduit is employed to connect the tubular extension 193 of the valve 62' with the passage for the cylinder 96. The operation of the modified valve 62' is similar to that of the preferred form of valve 62 in that it can selectively direct fluid under pressure through one of the tubular extensions 156', 127', or 119' and 193'.

Referring to Figs. 13 to 16, a modified form of valve 62" is provided with a cylindrical body 139" having a cylindrical bore 140" in which is axially slidably positioned a cylindrical valve member 145" having a stem 146". The valve member 145" is formed with an axial passage 148" in one end of which a tubular connection member 155" is threaded. The valve body 139" is formed with spaced longitudinally aligned tubular extensions 119", 127" and 156", preferably three in number. The valve member 145" is formed with radially directed passages 210, 211 and 212 which communicate at their inner ends with the passage 148" and which have their axes positioned in the same plane at the tubular extensions 119", 127" and 156".

Figure 13:
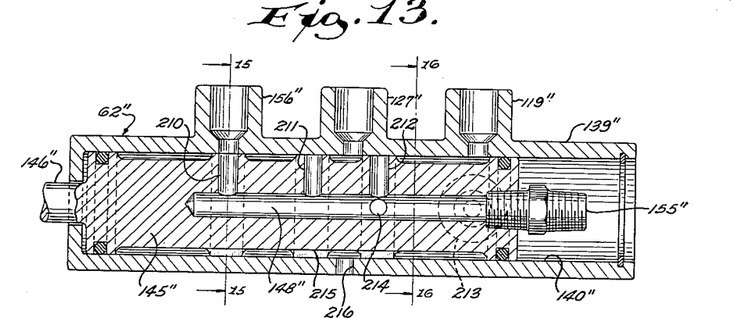
Fig. 13 is a longitudinal vertical sectional view of a modified form of selector valve adapted for use with the improved outboard motor and having embodied therein an axially movable cylinder, the latter being shown in high position.

The passage 210 is positioned to register with the tubular extension 156" when the valve member 145" is in its extreme leftmost position, as shown in Fig. 13. The passage 211 is spaced from the passage 210 a shorter distance than the spacing between the tubular extensions 127" and 156" so that the passage 211 is out of communication with the tubular extension 127" when the valve member is in the position of Fig. 13. The passage 212 is positioned so that when the valve member is in the position of Fig. 13, said passage is spaced from the tubular extension 119" a distance slightly less than the distance between the tubular extensions 127" and 156", so that upon movement of the valve member to its extreme right hand position the passage 212 will register with the tubular extension 119" without bringing the passage 210 into registration with the tubular extension 127".

It is apparent that the valve member 145" can be moved to the right from its position in Fig. 13 to bring the passage 211 into registration with the tubular extension 127", thereby moving the passage 210 out of registration with the tubular extension 156". It is also apparent that, as shown in Fig. 14, the valve member 145" can be moved slightly farther to the right from the position just mentioned to move the passage 211 out of registration with the tubular extension 127" to a neutral position wherein none of the passages 210 to 212 registers with a tubular extension.

Figure 14:
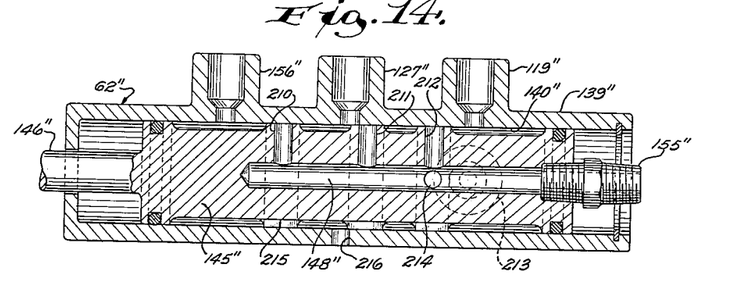
Fig. 14 is a view sismilar to Fig. 13 showing the valve cylinder in neutral position.
Figure 15:
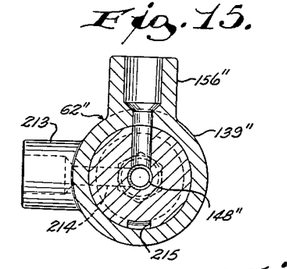
Fig. 15 is a transverse vertical sectional view taken along the line 15—15 of Fig. 13.
Figure 16:
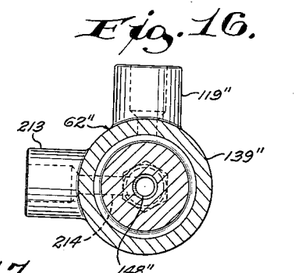
Fig. 16 is a transverse vertical sectional view taken along the line 16—16 of Fig. 13.

The valve body 139" may be formed with a laterally directed tubular extension 213, which extension communicates with the bore 140" and is axially offset from the tubular extension 119" a short distance to the left as viewed in Fig. 14. The valve member 145" is formed with a laterally directed radial passage 214 which is in the same transverse plane as the passage 212 and which communicates with the passage 148". The passage 214 is positioned to communicate with the tubular extension 213 when the valve 145" is moved toward its extreme right hand position, and due to the offset position of the tubular extension 213 with respect to the passage 214, said communication takes place just a short time before the passage 212 communicates with the tubular extension 119". It is apparent that if the cylinder 113, through a suitable conduit, communicates with the tubular extension 213, and if the conduit 119 affords communication between the tubular extension 119" and the cylinder 120, the valve 62" will direct fluid under pressure into the cylinder 96 a short time before said fluid is directed into the cylinder 120 as the valve member 145" is moved toward its extreme right hand position.

At each side of each of the passages 210 to 212 the valve member 145" is formed with portions of reduced external diameter, and a longitudinal groove 215 communicates with all of said portions. The valve body 139" is also formed with a scavenging port 216 which communicates with the groove 215 in all positions of movement of the valve member 145" so that all of the tubular extensions except the one into which fluid is being directed are in communication with the scavenging port 216.

It is apparent that when the valve 62" is used, suitable actuating mechanism therefor must be provided to convert the rotative motion of the handle 163 into a push or pull motion. When the valve 62" is used, the conduits 156 and 127 respectively are connected to the tubular extensions 156" and 127". It is apparent that the valve 62" is operable to direct fluid under pressure selectively to the tubular extensions 156", 127", or 119" and 213 or into none of the above-mentioned tubular extensions in the case of neutral position.

Reference is made herein to divisional application, Serial No. 288,580, filed May 17, 1951, for subject matter shown and disclosed but not claimed herein.

Various changes and modifications may be made without departing from the spirit of the invention, and all of such changes are contemplated, as may come within the scope of the claims.

What I claim as the invention is:

1. In an outboard motor having a vertical depending drive shaft and having a driven shaft vertically aligned therewith, and having a depending casing for said shafts, said casing including an upper section forming an oil reservoir which surrounds said drive shaft, a first carrier plate rotatable on said drive shaft below said reservoir, a second carrier plate rotatable on said drive shaft below the first carrier plate, planetary reducing pinions rotatably carried by one of said carrier plates, a sun gear on said drive shaft in mesh with said planetary pinions, a ring gear in said casing surrounding said pinions and having internal teeth which are engaged by said planetary pinions, a brake band surrounding said ring gear for engaging the latter, a set of reversing planetary pinions on said second carrier plate, a second sun gear fixed to said drive shaft and in mesh with pinions of said reversing set, a second ring gear fixed to said driven shaft and surrounding said set of reversing pinions and having internal teeth which are engaged by pinions of said reversing gear set, a brake band surrounding said second ring gear for engaging the latter, means connecting said first and second carrier plates for rotation together, hydraulic means including oil from said reservoir for selectively operating said brake bands to control said driven shaft, and a control for said hydraulic means which is accessible to the operator of the motor.

2. In an outboard motor having a drive shaft and having an aligned driven shaft and having a depending casing for said shafts, said casing including an upper section forming an oil reservoir surrounding said drive shaft, a clutch supporting disk below said reservoir through which said driven shaft loosely extends, clutch means on said disk for seelctively causing rotation of the disk with the shaft, a first carrier plate loosely surrounding said drive shaft below said clutch supporting disc, a second carrier plate loosely surrounding said drive shaft, planetary pinion studs connecting said carrier plates with each other and with said disk, planetary pinions on said studs above one of said carrier plates, a sun gear on said drive shaft in engagement with said planetary pinions, a ring gear surrounding said pinions and having internal teeth with which said planetary pinions coact, a brake band surrounding said ring gear to engage the latter, short studs connecting said first and second carrier plates, planetary pinions on said short studs and also on the studs which connect the carrier plates with the disk, which pinions form a reversing set, a sun gear fixed to said drive shaft and engaging pinions of said reversing set, a ring gear connected to said driven shaft and surrounding said last mentioned carrier plate and having internal teeth which are engaged by pinions of said reversing set, a brake band surrounding said second ring gear to engage the latter, hydraulic means including oil from said reservoir for actuating said clutch and for selectively actuating said brake bands to control the driven shaft, and a control for said hydraulic actuating means which is accessible to the operator of the motor.

3. In an outboard motor having a vertical drive shaft, a casing surrounding said drive shaft and including a section forming an oil reservoir, said section having a bottom wall shaped to provide a depending annular piston around the drive shaft, a clutch connected to said drive shaft below said piston, said clutch having a vertically movable engaging member, a cup-shaped cylinder connected to said clutch engaging member and positioned for axial sliding movement on said piston, means including oil from said reservoir providing a source of fluid under pressure, a manually operated valve communicating with said source, and conduit means connecting said valve and the interior of said cylinder whereby said clutch can be selectively engaged by manual operation of said valve.

4. In an outboard motor having a vertical drive shaft, a casing surrounding said drive shaft and including a section forming an oil reservoir, said casing section having a bottom wall shaped to provide a depending piston, a clutch connected to said drive shaft below said piston, said clutch having a vertically movable engaging member, a cup-shaped cylinder connected to said clutch engaging member and positioned for axial sliding movement on said piston, means including oil from said reservoir providing a source of fluid under pressure, a manually operated valve communicating with said source, and conduit means connecting said valve and the interior of said cylinder whereby said clutch can be selectively engaged by manual operation of said valve.

5. In an outboard motor having a vertical drive shaft, a casing surrounding said drive shaft and including a cup-shaped portion having a bottom wall shaped to provide an annular stationary piston on its underside, there being an inverted cup-shaped recess within said piston, said drive shaft extending rotatably through said bottom wall and recess, a clutch connected to said drive shaft below said piston, said clutch having a vertically movable engaging member, an annular cylinder which is U-shaped in radial cross-section positioned for axial sliding movement on said piston, there being an annular space within said cylinder and around said drive shaft, a bearing within said annular cylinder in said annular space, said clutch engaging member having an upstanding sleeve which is positioned within said bearing and around said drive shaft and slidable on the latter with said bearing and annular cylinder, a source of fluid under pressure, a valve communicating with said source, and conduit means connecting said valve and the interior of said cylinder whereby said clutch can be operated by said valve.

6. In an outboard motor having a vertical drive shaft and having a vertical driven shaft, a vertical casing for said shafts depending from the motor and including an oil reservoir below the motor, a planetary gear train connected to said driving and driven shafts and having a rotatable ring gear, brake mechanism for preventing rotation of said ring gear to thereby cause transmission of power from said drive shaft to said driven shaft through said planetary train, fluid pressure operated mechanism for actuating said ring gear brake, a fluid pump in the reservoir portion of the casing above said planetary gear train, a valve communicating with said pump and with said fluid pressure operated mechanism, and a control handle accessible to the operator for actuating said valve.

References Cited in the file of this patent

UNITED STATES PATENTS

| | | |
|---|---|---|
| 710,500 | McElroy | Oct. 7, 1902 |
| 760,160 | Smith | May 17, 1904 |
| 1,149,408 | Royce | Aug. 10, 1915 |
| 1,159,018 | Hall | Nov. 2, 1915 |
| 1,364,392 | Macho | Jan. 4, 1921 |
| 1,683,893 | Irgens | Sept. 11, 1928 |
| 2,181,647 | Wheaton | Nov. 28, 1939 |
| 2,258,005 | Durdin | Oct. 7, 1941 |
| 2,519,022 | Burtnett | Aug. 15, 1950 |
| 2,521,022 | McDowall | Sept. 2, 1950 |
| 2,528,480 | Wilson | Oct. 31, 1950 |